United States Patent [19]

Otocki

[11] Patent Number: 4,513,682
[45] Date of Patent: Apr. 30, 1985

[54] POSITIVE DRIVE ROTATOR

[75] Inventor: Tadeusz S. Otocki, Hanover Park, Ill.

[73] Assignee: Protectaire Systems Co., Elgin, Ill.

[21] Appl. No.: 361,518

[22] Filed: Mar. 24, 1982

[51] Int. Cl.³ ............................................. B05B 15/04
[52] U.S. Cl. .................................... 118/322; 118/326; 118/DIG. 7; 198/344; 198/680
[58] Field of Search ............... 198/344, 377, 378, 680; 118/322, 326, DIG. 7

[56] References Cited

U.S. PATENT DOCUMENTS

| | | | |
|---|---|---|---|
| 3,684,078 | 8/1972 | Nielsen | 198/377 |
| 3,921,575 | 11/1975 | Ishii | 118/322 |
| 4,086,999 | 5/1978 | McDonald | 198/377 |
| 4,180,152 | 12/1979 | Sefcik | 198/344 X |
| 4,207,833 | 6/1980 | Napadow | 118/324 |

Primary Examiner—Jeffrey V. Nase
Attorney, Agent, or Firm—Fitch, Even, Tabin & Flannery

[57] ABSTRACT

In a booth in which articles are carried along a pathway for treatment with sprayed material directed through nozzles or the like at the pathway, apparatus is provided for positively rotating the conveyed articles to assure uniform treatment on all sides thereof. Article supports are connected to the conveyer, each having a first portion carried by the conveyer and a second portion rotatable relative to the first portion for holding an article. A toothed member on the second portion is positively engaged by and driven by links of a link belt to rotate the second hanger portion and the article held thereon.

3 Claims, 6 Drawing Figures

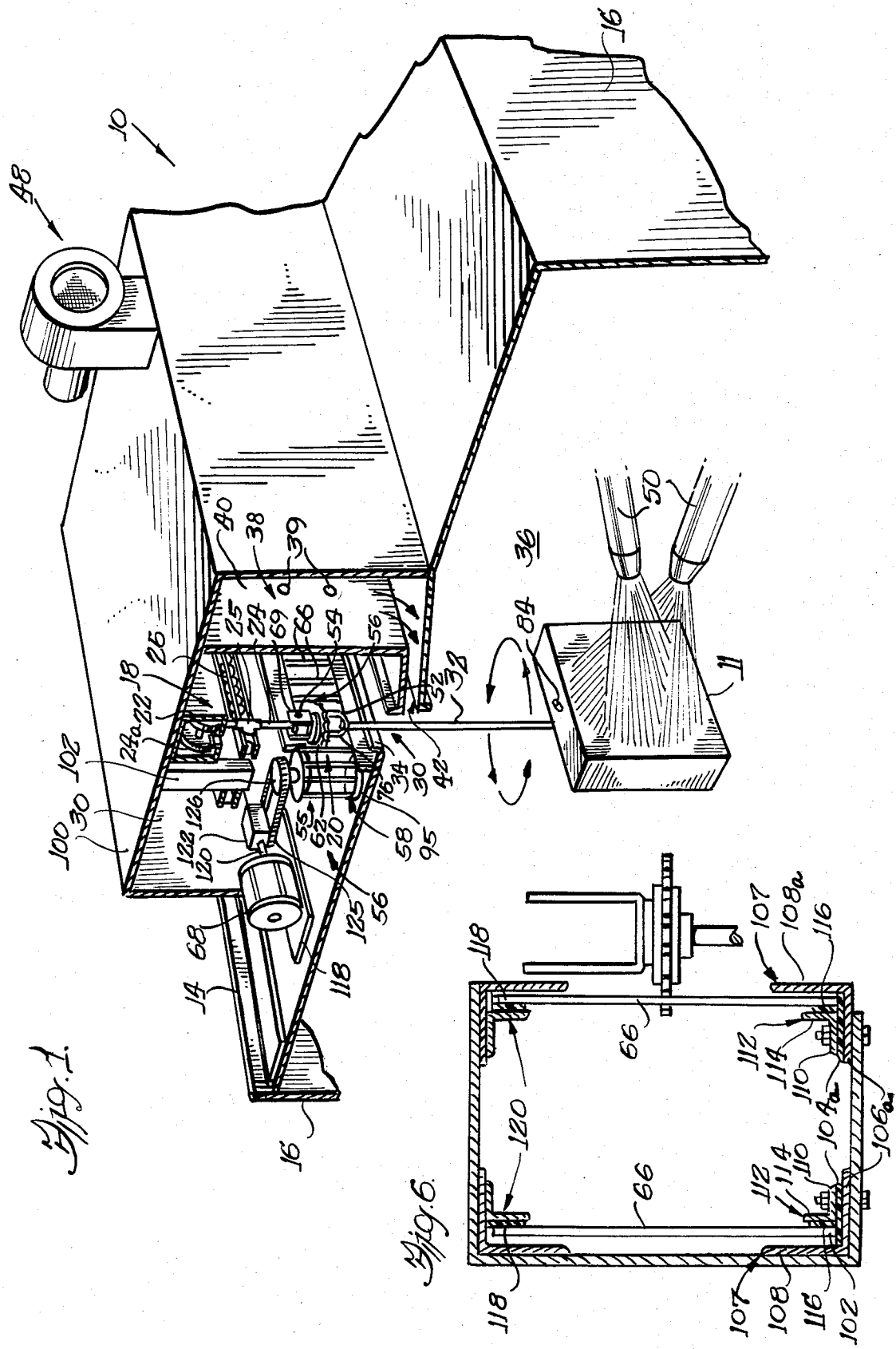

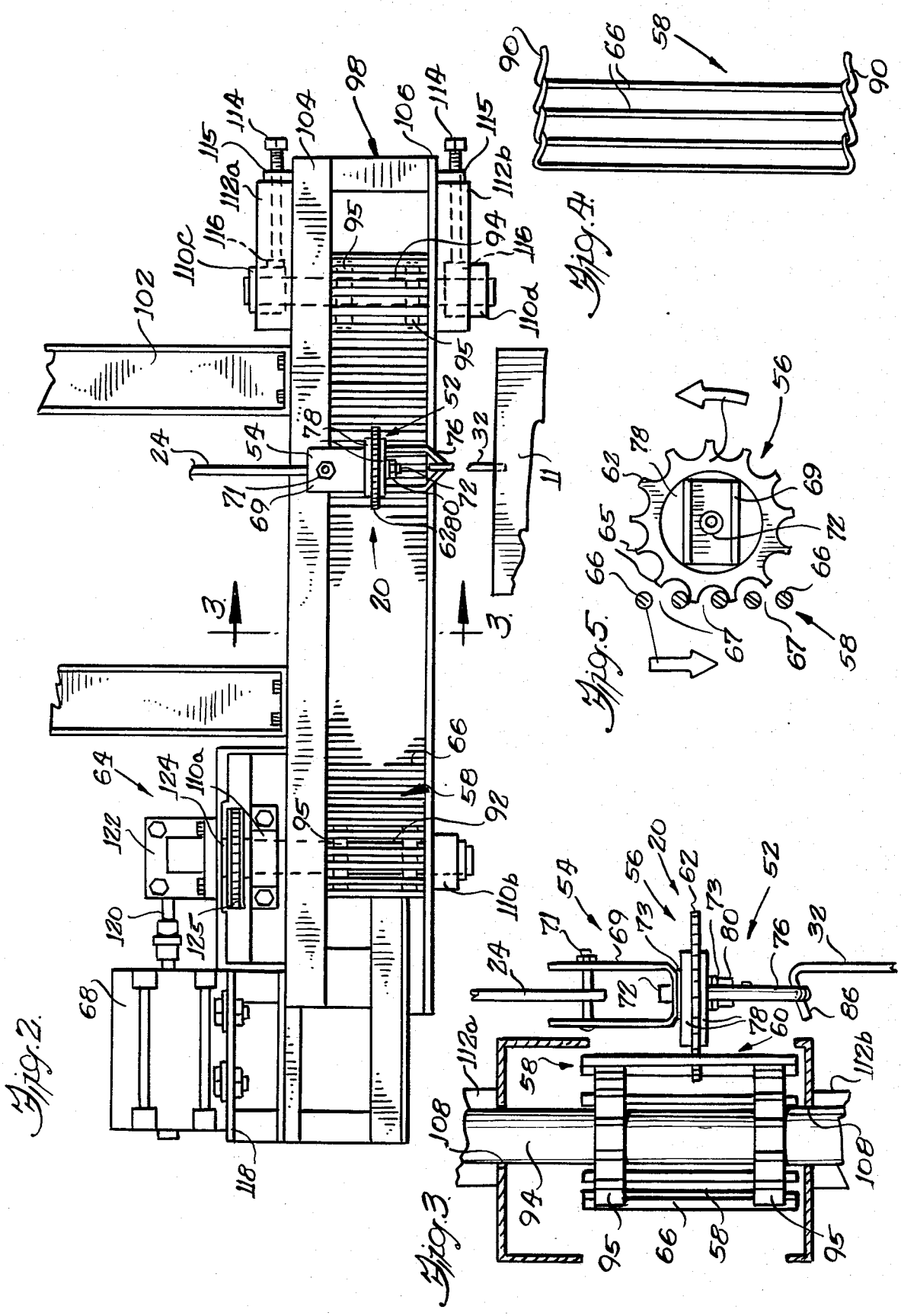

POSITIVE DRIVE ROTATOR

This invention relates to apparatus for conveying articles for treatment with sprayed material and more particularly to apparatus including means to rotate conveyed articles to assure generally uniform treatment on all sides of the article.

In many industrial applications, articles are conveyed through an enclosed booth and treated with fluids or airborne particles directed thereat. Napadow, U.S. Pat. No. 4,207,833 describes one such booth in which articles are suspended from hangers carried by an overhead conveyor. The conveyor is protected from the corrosive or contaminated atmosphere within the booth by a curtain of air which is caused to flow along the conveyor and prevent spray particles from reaching the conveyor. As is common practice in booths of this type, the material for treating the articles is sprayed toward the articles from nozzles disposed alongside the path of article conveyance, and a continuous airflow pathway is provided in the booth for removing solvent and overspray from the booth.

Because treatment materials, such as spray coatings, are generally directed at the articles from one side of the article conveyance pathway, it is preferred in many cases to rotate the articles carried by the conveyor to assure generally uniform treatment of all sides of the article.

As a means of rotating articles within a booth, it is known to provide rotatable article carriers associated with the conveyor that are turned by an elastomeric, flexible belt traveling parallel to the conveyor. Such rotatable carriers may have tires about their rotational axes for frictional engagement with the traveling belt. The elastomeric belt is driven at a faster speed than the belt to rotate the articles being sprayed through a predetermined number of revolutions during their traverse of the spray painting nozzles. In other installations, the tires are abutted against a stationary plate and turn as the tires roll along the plate.

It has been found that a system which relies on frictional engagement between a tire and a moving belt has at times failed to assure uniform article rotation and treatment to all sides of the articles as a result of slippage and or sporadic engagement of the belt with the tire. Sporadic frictional engagement results from several causes. The moving belt has a tendency to throw the tires outward of the belt, i.e., to the side, particularly at high belt speeds, resulting in the tires bouncing along the belt. Non-uniform wear spots on the belt may also be a source of bouncing or slipping of the tires on the belt. If the conveyer and/or belt are not properly aligned, or if the article carriers are not suspended in perfect alignment from the conveyor, uneven wear on the belt may occur and as a result individual tires may be out of contact with the belt in portions of their travel through the booth. Treatment substance accumulating on the belt and/or tires may reduce friction therebetween also resulting in slippage. Thus, the articles may not be turned uniformly or through the described r.p.m. Uneven coating of articles, due to poor frictional engagement, may necessitate discard or retreatment of articles, in either case, increasing the cost of manufactured articles.

Accordingly, it would be desirable to have apparatus to assure rotation of articles at a predetermined r.p.m. as they are carried through a booth for spray treatments.

It is a general object of this invention to provide an improved system for rotating and carrying articles through a spray booth so that waste resulting from unevenly treated articles is substantially eliminated.

These and other objects and advantages of the invention will become more apparent from the following detailed description of the drawings in reference to the accompanying drawings in which:

FIG. 1. is a perspective sectional view of the upper portion of a spray treatment booth having conveying apparatus and article-rotating apparatus embodying various features of the present invention;

FIG. 2 is an elevational view of the article-rotating apparatus of FIG. 1;

FIG. 3 is an enlarged cross-sectional view taken along line 3—3 of FIG. 2;

FIG. 4 is an enlarged elevation view of a portion of a continuous engagement chain of the article-rotating apparatus of FIG. 2;

FIG. 5 is an enlarged, horizontal cross-sectional view taken through the belt and above sprocket engaged in the belt; and FIG. 6 is a cross-sectional view showing the slide guides for the link belt.

As shown in FIG. 1 for purposes of illustration, the invention is employed in a substantially enclosed treatment booth 10 wherein articles are treated with sprays of liquids or airborne particles. Typically, the booth 10 is an elongated building-like structure having vertical side walls (not shown), a top wall 14, and end walls 16 to enclose and contain the environmentally deleterious fluid or airborne particles used for treatment.

As a means of exposing a succession of articles 11 to the treatment substance, a conveyer means or conveyer 18 travels within the booth carrying article support means or hangers 20 that hold the articles 11 for conveyance along a pathway through the booth. The conveyer 18 may be of various configurations. The illustrated conveyer configuration comprises an elongated channel or beam support 22, rollers 24a connected to ride longitudinally along the support, a flexible chain 26 or the like which extends longitudinally along the beam support 22 and vertical bars 24 depending from the rollers and having members 25 connected to spaced-apart links on the chain. An appropriate drive (not shown) powers the conveyer chain 26 and thereby moves the rollers, hangers, and articles along the beam support 22. Typically, the beam support 22 and conveyer chain 26 are in the form of endless loops allowing unidirectional movement of the conveyer. The conveyor 18 extends beyond the sides of the booth 10 whereby articles 11 are conveyed into, through, and out of the booth.

To substantially isolate the conveyer 18 and associated apparatus from the treatment materials within the booth 10, the conveyer and associated apparatus are disposed above a main treatment chamber 36 and housed in a subchamber or plenum 30 formed on the top wall 14 of sheet metal or plastic that generally surrounds the apparatus. Only lower hooks 32 depending from the hangers extend through a slot 34 in the top wall 14 that communicates the plenum 30 with the main treatment chamber 36.

To protect the conveyor, an air curtain or air flow pattern is created to force air down through the slot 34 and to sweep away paint particles from flowing upwardly into the conveyor and the protective housing 30. Herein, a blower 48 discharges air under pressure into an air plenum 38 extending below the blower and along side the conveyor. Slots or holes 39 in a plenum wall 40 allow some air to flow into the housing 30 but most of the air flows through an air discharge slot nozzle 42 in a horizontal path across the hangers 20 and across the underside of the slot 34.

The positive pressure of air from nozzle 42 is directed across the slot 34 preventing the travel of treatment upwardly thereby protecting the conveyer 18 and other mechanisms in the chamber 30 from corrosion or deposits which would occur if the treatment material were to accumulate thereon.

A plurality of spray means 50, such as spray guns, direct a treatment of fluid or airborne particles toward the path of the travel of the suspended articles 11 through the booth 10. Preferably, the spray guns are on the side of the booth and direct their spray in the same direction that the air is discharging from the nozzle 42.

For many applications, it is necessary that the sprayed substance be applied to all sides of the articles evenly, and, accordingly, the article supports 20 by which the articles 11 are supported from the conveyor 18 each have a first portion 52 rotatable relative to a second portion 54 attached to the conveyor 18, and means indicated generally at 56 are provided engaging and rotating the first portion relative to the second portion as each article-carrying hangar 20 is conveyed through the booth to expose all sides of each article 11 to spray.

In accordance with the present invention, the articles 11 are rotated positively through a predetermined number of rovolutions by a positive drive means 55 preferably located in the protected housing 30 to assure generally uniform treatment of the articles by a substance sprayed by the guns 50 positioned along one side of the pathway. The first or upper portion 54 of each article support 20 is carried along the pathway by the conveyer 18, and a second or lower portion 52 is journaled for rotation relative thereto and carries a toothed rotable means or spinner 62 which is positively driven by a traveling belt or chain 58 in toothed engagement with the spinner 62. The belt 58 has a run 60 parallel to the pathway of the conveyed articles 11 and provides surfaces that are complementary to and positively mesh with the teeth 65 of the rotatable spinner 62 carried by the lower hanger portion 52 to positively rotate the same and articles 11 suspended therefrom. The preferred surfaces to turn the spinners are belt links 66. The traveling belt 58 is driven by a drive 64 to move the engagement belt 58 at a predetermined speed relative to the conveyor 18, thereby determining the speed at which the articles 11 are rotated. Typically, the articles are rotated a much greater speed than the speed of the conveyor travel and this is accomplished by driving the belt at a speed substantially greater than the speed of the conveyor.

In a preferred embodiment, the rotatable spinner 62 carried by the support means is a sprocket wheel having teeth 65 which project into complementary spaces 67 between links 66 of the engagement belt 58 with the links abutting the teeth and forcing them to rotate, as seen in FIG. 5. The engagement belt 58 in a preferred embodiment has a plurality of vertically linked bars or links 66 perpendicular to the plane of the sprocket wheel 62 spaced for engagement with the sprockets thereof. The drive means 64 preferably includes a motor 68 connected to the engagement chain 58 providing for rotation of the articles 11 within a wide range of rotational speeds. By way of example, the conveyor speed may be about 20 feet minute which would give about 25 revolutions per minute if the wire belt 58 was stationary. However, the wire belt is preferably driven substantially faster than the conveyor belt to give a total of 80 revolutions per minute to the articles with the speed of the belt providing the additional 55 revolutions per minute to the 25 r.p.m. due to the conveyor travel.

The upper portion 54 of each hanger 20, in the illustrated embodiment, is a U-shaped bracket 69 connected at its upper ends by a bolt 71 to the vertical connecting bars 24 of the conveyer 18, and a shaft 72, on which the lower portion 52 of the hangar is mounted for rotation, is carried by the horizontal lower segment of the bracket. The shaft 72 is a bolt with its head resting on the horizontal lower bracket segment and its thread extending through an aperture in the lower segment.

The lower portion of each hanger 20 is mounted for rotation about the thread of the bolt shaft 72 and comprises the sprocket wheel 62 and a rigid wire loop 76 suspended therefrom for holding the hooks 32. The sprocket wheel 62 is rigidified by a large washer 78 along each side, and the sprocket wheels and washers are joined together by the upper ends of the loop 76 which extend through aligned apertures in the washers and sprocket wheels and are welded or otherwise secured therein. A nut 80 at the lower end of the bolt thread retains the lower portion thereon with thrust bearing 73 including low-friction plastic washer, above the sprocket wheel 62 to facilitate rotation of the sprocket wheel.

From each loop is hung one of the elongated hooks 32, each having an article-engaging lower end 84 and an upper end 86 that hooks onto the wire loop 76. The elongated hooks 32, which extend through the slot 34 between the plenum 30 and main chamber 36, are interchangeable for holding articles at a desired vertical level within the booth according to the size of article and the treatment application.

The driving belt 58, which provides the complementary surfaces that mesh with the sprocket wheel 62, comprises the plurality of wire links (FIG. 4) or rods 66 having formed ends 90 joined to each other to form continuous interlinked loops at opposite ends of the parallel rods. Such belts are commercially available, as for example those sold under the trade name Sani-grid by Cambridge. Preferably, the rods 66 of the chain are formed of a metal, such as stainless steel, which is resistant to corrosion and which is hard wear resistant material. Rust or other material dropping through the slot 34 would damage the articles 11.

Herein, the drive belt 58 is disposed below the conveyer chain 26 and positioned so that its rear run 60 engages the sprocket wheel 62 of each hanger 20 conveyed therealong. The chain links 66 are vertical and perpendicular to a plane through the sprocket wheels 62. Preferably, the hangers 32 are in a plane parallel to the plane of the links 66 in the driving run 60 as the articles are painted. Because the links are long, the sprocket wheels need not be precisely located at any given height and they will still mesh with the links. If wear occurs on the links, the sprockets may be shifted vertically to engage other portions of the links to increase life of the wire belt.

Positive engagement between the sprocket wheels 62 and links 66 is not affected by slipperiness caused by accumulation of treatment material on the surfaces of the links and sprocket wheels. Thus, positive rotation of each article 11 passing through the booth 10 is assured, helping to provide generally uniform treatment to all sides of each article. The shafts 92, 94 each carry a pair of sprocket wheels 95 on which the engagement belt 58 is entrained, with its looped ends 90 just above and just below the sprocket wheels.

The engagement belt 58 and associated drive apparatus are mounted within a rigid frame structure 98 which maintains a relative alignment of the engagement chain 58 and associated drive apparatus. Herein, the frame 98 is suspended from a top 100 of the plenum 30 by depending brackets 102. The engagement chain 58 is disposed between an upper frame member 104 (FIG. 2) and a lower frame member 106, and shafts 92, 94, between which the engagement chain is entrained, extend through elongated slots 108 in the upper and lower frame members and are mounted for rotation in bearing brackets 110a,b,c,d, above and below the upper and lower frame members.

The engagement chain driving shaft 92 is mounted for rotation by upper and lower bearing brackets 110a,b (FIG. 2) connected to the support frame structure above and below the upper and lower frame members 104, 106. The driven shaft 94 at the opposite end of the support frame 98 also extends through the slots 108 (FIG. 3) of the upper and lower frame member 104, 106, but its upper and lower bearing brackets 110c,d, by which it is mounted for rotation, are carried by upper and lower tracks 112a,b above and below the frame members, and the driven shaft is slidable along the tracks to move the driven shaft 94 within the slots toward and away from the driving shaft 92 for adjustment of engagement chain tension and parallel alignment of the shafts.

The driven shaft bearing brackets 110c,d are slid along the tracks 112a,b by bolts 114 extending through fixed flanges 115 at the ends of the tracks and extending into threaded apertures of flanges 116 on the sides of and integral with the bearing brackets 110c,d. The bolts 114 (FIG. 2) are rotatable within but stationary relative to the fixed flange 115, and, as the bolts are turned within the bearing bracket flanges 116, the bearing brackets 110c,d are moved toward or away from the fixed brackets adjusting tension and alignment.

In the illustrated embodiment, the motor 68 which powers the engagement chain 58 is mounted in front of the engagement chain on a frame support platform 118 elevated above the upper frame member 104. A drive shaft 120 of the motor 68 (FIG. 1) extends horizontally into and turns a torque and speed converter 122 which has a sprocket at a output end for driving chain 125 which is meshed with a sprocket 126 fixed to the upper end of shaft 92.

To assist in guiding the belt links 66 through their travels and with a reduced amount of friction, the links 66 may be guided by slides or guides of a friction reducing material such as polyethylene or teflon. Herein, the guides are flat, narrow strips of polyethylene UHMW sold by the Polymer Corporation. The links 66 have their lower ends 102 resting on thin plastic strip guides 104a (FIG. 6) supported on a horizontal web 106a of a bottom angle 107 which has another vertical web 108 spaced outwardly of the links 66. The strip guide 104a is sandwiched between the lower web 106 and an upper web 110 of a smaller inner angle 112 and is bolted between these webs. An upwardly extending web 114 on the angle 112 has a further vertical, lower strip guide 116 secured along its outwardly facing side of the vertical web 114. The lower ends of the links will slide along the lower guides 116.

Similar upper strip guides 118 are fastened to upper, inner angles 120, and are in vertical planes with the lower strip guides 116. Thus, the upper and lower ends of the links 66 slide along the vertical plastic guides 116 and 118 with little friction. Because the lower ends of the links 66 rest on and slide along the respective bottom guides 104a, the links 66 travel with a smooth sliding, with very reduced friction in their travel in their supporting framework.

While the preferred apparatus discloses a conveyer traveling along a linear path, the conveyor may travel through an arcuate or curved path. In some booths, the articles are conveyed in a generally arcuate path through about 270° from ingress of the booth. In these arcuate path booths, the article supports often project upardly from an underlying conveyor. These upwardly projecting article supports have a first or lower portion that does not rotate and a second or upper rotating spindle end on the article support. The upper spindle may have attached thereto a spinner or toothed wheel for being driven by the linked belt, as above-described, to rotate the articles positively. A suitable air curtain should be provided to protect the linked belt and conveyor from the sprayed particles, as has been described above.

The advantages of the invention should now be more fully appreciated. Articles carried through an enclosed booth for treatment are rotated at a preselected speed which optimizes uniform treatment. Because of the positive driving of the spinners by the wire belt there is no relative slippage therebetween and all articles 11 passing through the booth 10 are assured of rotation at the preselected speed. Thus, waste due to sporadic rotation, as may occur when frictional engagement is used to rotate the articles, is substantially eliminated.

While the invention has been described in terms of a preferred embodiment, modifications obvious to one with ordinary skill in the art may be made without departing from the scope of the invention. For example, while it is preferred that the sprocket wheel 62 engages a moving belt so that the rotational speed may be adjusted, in certain applications it may be sufficient to provide means, such as a waved or corrugated wall which engages and rotates the passing sprocket wheels.

Various features of the invention are recited in the following claims.

I claim:

1. An apparatus including a spray booth for conveying and rotating articles, said apparatus comprising:
   an overhead beam support in said booth,
   a conveyor for articles mounted on the overhead beam support for traveling therealong during a spraying operation,
   hanging article supports attached to the conveyor and having rotatable lower portions for rotating the articles about a vertical axis,
   toothed members of a predetermined vertical length connected to the rotatable lower portions to rotate the same at a predetermined number of revolutions per unit of travel by the conveyor,
   an endless belt drive means depending from the overhead beam support and including an elongated endless drive belt,
   an upper and lower spaced frame members on said belt drive means extending longitudinally beneath the overhead beam support, belt sprockets rotatably mounted in said upper and lower spaced frame members at spaced locations to rotate about vertical axes, a motor drive connected to one of the belt sprockets to drive the same at various predetermined speeds to change the number of rotations of the article per unit of conveyor travel, and said elongated endless drive belt having a plurality of vertically extending elongated rods each of a length several times longer in the vertical direction than the predetermined vertical extent of the teeth on the toothed members to allow positioning of the toothed members at different vertical heights along the rods to distribute placement of the toothed members and wear therefrom along the rods in the vertical direction, a protective housing about said conveyor and said upper and lower spaced frame members and having a bottom wall beneath said endless drive means and said frame members, a slot in said protective housing through which depend said article hanging supports which are being rotated within said protective housing, and means to blow air through the slot to protect the endless belt drive means and said toothed members.

2. An apparatus in accordance with claim 1 in which said motor drive is supported by said overhead beam support and comprises an overhead motor and a depending drive extending downwardly to one said belt sprockets to drive the belt.

3. An apparatus in accordance with claim 1 including upper and lower plastic guide slides mounted in the upper and lower frame members and along which slide the rods of the belt at a reduced frictional resistance, said lower plastic guides supporting lowers of said rods.

* * * * *